United States Patent
Oles et al.

(10) Patent No.: US 8,111,421 B2
(45) Date of Patent: Feb. 7, 2012

(54) ORDER SEPARATOR FOR PHOTOGRAPHIC ORDER FULFILLMENT

(75) Inventors: David J. Oles, San Marcos, TX (US); Jun Yoshida, Austin, TX (US)

(73) Assignees: Dai Nippon Printing Co., Ltd., Tokyo-To (JP); DNP IMS America Corporation, San Marcos, TX (US)

( * ) Notice: Subject to any disclaimer, the term of this patent is extended or adjusted under 35 U.S.C. 154(b) by 1180 days.

(21) Appl. No.: 11/886,443

(22) PCT Filed: Mar. 15, 2006

(86) PCT No.: PCT/US2006/009365
§ 371 (c)(1),
(2), (4) Date: Sep. 14, 2007

(87) PCT Pub. No.: WO2006/099505
PCT Pub. Date: Sep. 21, 2006

(65) Prior Publication Data
US 2008/0213015 A1   Sep. 4, 2008

Related U.S. Application Data

(60) Provisional application No. 60/594,144, filed on Mar. 15, 2005.

(51) Int. Cl.
*G06K 15/00* (2006.01)
(52) U.S. Cl. ........................................ 358/1.18; 358/2.1
(58) Field of Classification Search .................. 358/1.9, 358/2.1, 1.15, 1.18, 1.13
See application file for complete search history.

(56) References Cited

U.S. PATENT DOCUMENTS

| 4,201,464 A | 5/1980 | Botte |
| 5,623,581 A | 4/1997 | Attemberg |
| 6,279,821 B1 * | 8/2001 | Kubitsky et al. ............. 229/193 |
| 7,760,373 B2 * | 7/2010 | Oshima ........................ 358/1.13 |

(Continued)

FOREIGN PATENT DOCUMENTS

JP   2005-221809 A   8/2005

(Continued)

OTHER PUBLICATIONS

International Search Report, PCT/US2006/009365, Sep. 22, 2006.

(Continued)

*Primary Examiner* — Jerome Grant, II
(74) *Attorney, Agent, or Firm* — Matthew J. Booth & Associates, PLLC; Matthew J. Booth

(57) ABSTRACT

The present invention discloses an apparatus 100 that provides an order separator 330 for photographic order fulfillment. The present invention includes one or more output print devices 110 that print one or more photographic prints 320 of a photographic order 402/404/406 using photographic paper 300. Additionally included is a separator print 330 that is a sheet of photographic paper 300 that is larger than the photographic prints 302 of the photographic order 402/404/406. The present invention further includes a system controller 102 that controls the utilization of the photographic paper 300 of the output print devices 110 for the photographic prints 320. The system controller 102 controls whether to create the separator print 330 or the photographic prints 320. The individual separator print 330 creates a tab 401/403/405 separating different photographic orders 402/404/406 of the photographic prints when multiple photographic orders 400 are stacked together.

16 Claims, 4 Drawing Sheets

U.S. PATENT DOCUMENTS

| | | | |
|---|---|---|---|
| 2005/0094196 A1* | 5/2005 | Saito et al. | 358/1.15 |
| 2006/0023237 A1* | 2/2006 | Endo | 358/1.13 |
| 2006/0139674 A1* | 6/2006 | Oshima | 358/1.13 |
| 2009/0059269 A1* | 3/2009 | Yano et al. | 358/1.15 |

FOREIGN PATENT DOCUMENTS

| | | |
|---|---|---|
| WO | 2004067286 | 12/2004 |
| WO | 2005045637 | 5/2005 |
| WO | 2006/099505 A2 | 9/2006 |
| WO | 2006/099505 A3 | 1/2007 |

OTHER PUBLICATIONS

Office Action Received for Japanese Patent Application No. 2008-502011, mailed on Apr. 26, 2011, 2 pages of Office Action and 2 pages of English Translation.

* cited by examiner

ORDER SEPARATOR FOR PHOTOGRAPHIC ORDER FULFILLMENT

TECHNICAL FIELD

The present invention relates to photographic order fulfillment. More specifically, the present invention relates to identifying separate photographic orders during the fulfillment process.

BACKGROUND ART

On demand printers (such as Dye Sublimation printers) are frequently used to create printed output from consumer photographs. Retailers are more and more frequently directing output from 2 or more consumer terminals (kiosks) or other consumer input points to on demand printers. Alternatively, these on demand printers are being used to create printed output from consumer film or prints as part of in store personnel operated "digital minilabs." Since on demand printers, such as dye sublimation, usually lack sorting devices or a method for back printing order information, retailers have difficulty identifying one customer order from the next customer order.

On demand printers typically have an excess piece of paper (hereafter paper waste) that is cut off and discarded at the end of the printing process. The paper waste is used to handle the paper in the printer and also ensures that the printer can print "full bleed" (edge to edge) without a white border.

The present invention is a method and apparatus that provides an order separator for photographic order fulfillment. The present invention includes a photographic printer that prints a photograph. And, the present invention includes a process where the paper waste area on the bottom of a separator sheet print is not cut from a photographic print so that when stacked the individual separator sheets create a tab separating the different customer photographic orders. Further, the present invention includes a process where the paper waste area on the top or the bottom of a print is not cut from the photographic print. Additionally, the present invention includes a process where the first print of an order is not trimmed leaving a tabbed structure. Further, the present invention includes a process where the last print of an order is not trimmed leaving a tabbed structure. And, the present invention includes a process as described above and including identifying text or graphics printed in the paper waste area. Finally, the present invention includes a photographic print with an order separator To aid in the understanding of the operational aspects of photographic order fulfillment, this disclosure uses as an example a stand alone digital photographic kiosk, such as the kiosk disclosed in International Patent Application Serial Number PCT/US2004/002079, filed 27 Jan. 2004 and published as WO 2004/067286, which is incorporated by reference for all purposes into this specification. Additionally, an example of using multiple photographic printers in the photographic order fulfillment process is described in International Patent Application Ser. No. PCT/US2004/036732, filed 4 Nov. 2004, and published as WO 2005/045637, which is incorporated by reference for all purposes into this specification. Further, this application claims the benefits of the earlier filed U.S. Provisional App. Ser. No. 60/594,144 filed 15 Mar. 2005, which is incorporated by reference for all purposes into this specification.

BEST MODE FOR CARRYING OUT THE INVENTION

The present invention is a method and apparatus that provides an order separator for photographic order fulfillment. The present invention includes one or more output print devices that print one or more photographic prints of the photographic order using photographic paper. The present invention additionally includes a separator print that comprises a sheet of photographic paper that is larger than the photographic prints of the photographic order. Further, a system controller controls the utilization of the photographic paper of the output print devices for the photographic prints, wherein the system controller controls whether to create the separator print or the photographic prints.

Additionally, the separator print creates a tab separating different photographic orders of the photographic prints.

Further, the separator print may comprise a separator sheet area comprising a single photographic print and an additional waste area made from the photographic paper combined with the separator print area. Additionally, the separator print may comprise a separator print area comprising a single print of thumbnail images and an additional waste area made from the photographic paper combined with the separator print area. Further, the additional waste area may be blank, contain photographic images, contain text, or contain a combination of photographic images and text. Additionally, the separator print may additionally comprise a blank sheet of the photographic paper.

BRIEF DESCRIPTION OF DRAWINGS

To further aid in understanding the invention, the attached drawings help illustrate specific features of the invention and the following is a brief description of the attached drawings.

DISCLOSURE OF INVENTION

The present invention is a method and apparatus for an order separator for photographic order fulfillment. This disclosure describes numerous specific details that include specific photographic printers, photographic paper, and photographic printing processes. One skilled in the art will appreciate that one may practice the present invention without these specific details.

Figure 1:
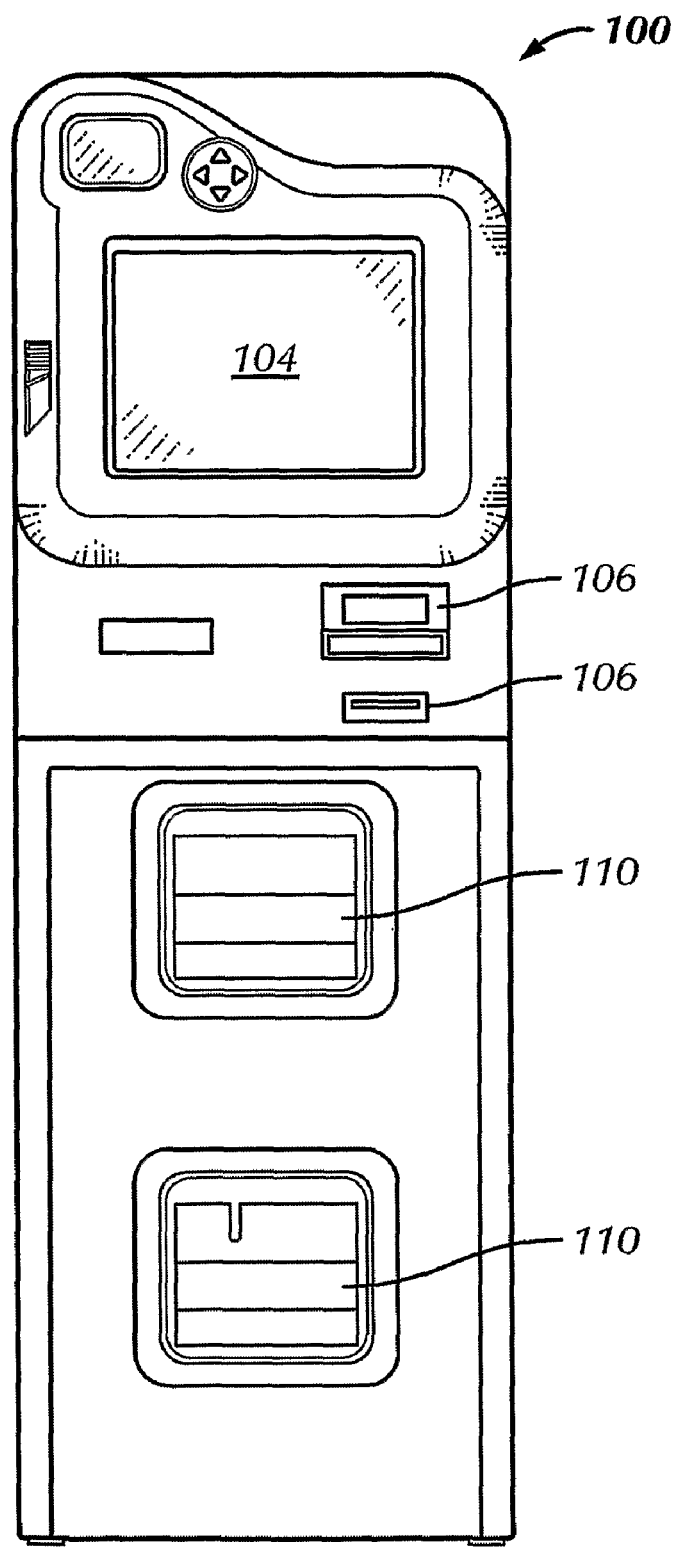
FIG. 1 is an illustration of a stand alone photographic order fulfillment apparatus.

FIG. 1 is an illustration of a stand alone photographic order fulfillment apparatus that comprises a digital photographic kiosk 100. The present invention can be implemented on a wide variety of equipment that is in current use for fulfilling photographic orders. For example, the present invention can be implemented using a back office minilab that includes a user input device. Or, it may be implemented with a combination terminal type kiosk that is networked to a minilab or stand alone on demand printers. Or, it can be implemented in a stand alone digital photographic kiosk as described in this disclosure. One skilled in the art will appreciate the wide variety of equipment that may be used to implement the claimed invention.

The photographic order fulfillment kiosk 100 typically comprises some type of user interface 104 that incorporates a display device. Kiosk 100 also includes the input data readers 106 that can be any device adapted to read digital data from a portable data storage device. Finally, kiosk 100 includes one or more output print devices such as photographic printers 110 that provide photographic prints for photographic images.

Figure 2:
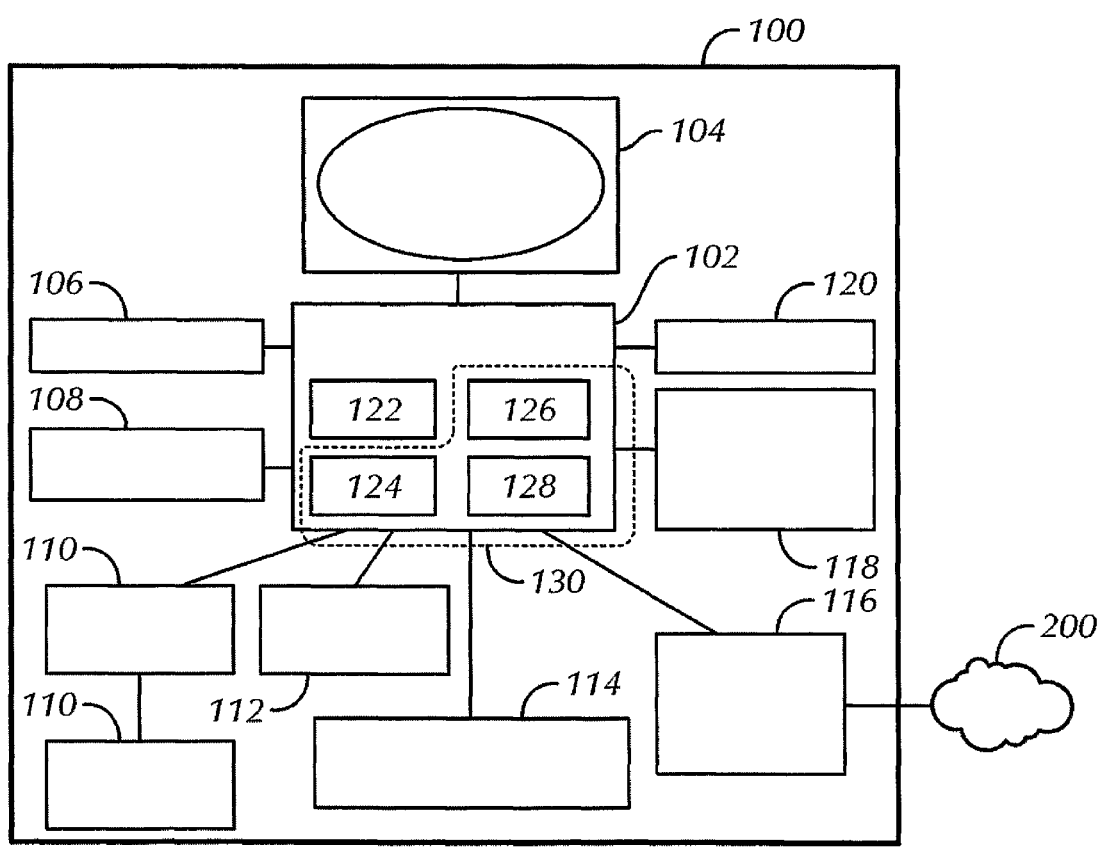
FIG. 2 is a block diagram of the stand alone photographic order fulfillment apparatus.

FIG. 2 is a block diagram of the photographic order fulfillment kiosk 100. Kiosk 100 may be located in a dedicated stand-alone cabinet, in a wall, in a cabinet with other devices, or in another housing or location. The particular physical embodiment of the photographic order fulfillment kiosk 100, such as the size and shape of its cabinet, or the presence of a dedicated cabinet at all, is not critical to the invention. Kiosk 100 includes a system controller or information handling system 102 that controls the operation of the kiosk 100. The system controller 102 may be any computing device capable of executing instructions and handling the inputs and outputs necessary to the operation of the kiosk. For example, the system controller 102 may be an off-the-shelf personal computer that includes a motherboard and interface card slots. FIG. 2 shows some of the functions that are possible with the system controller 102 that may include a photo editing function 122, a checkout function 130, a photo printing function 124, a photo archiving function 126, and a payment function 128.

The system controller 102 also connects to a user interface 104 that presents information and enables the user to interact with the kiosk 100. The user interface 104 may include a cathode ray tube, a flat panel liquid crystal display, or any other device capable of displaying information to a customer or a store clerk, alone or in combination with a series of multifunction buttons whose current functions may be indicated on the display. Additionally, the system controller 102 may connect to an input data reader 106. The input data reader 106 may be any device adapted to read digital data from a portable data storage device. The system controller 102 also connects to an internal storage device 108 such as a hard disk drive. The internal storage device 108 is adapted to store the photographic data received through the data reader 106 from a customer or the store clerk. The internal storage device 108 may also store other data, such as instructions for execution by the system controller 102.

Kiosk 100 further includes other components that connect to the system controller 102 that includes a payment acceptor 112 and a receipt/coupon printer 118. Also connected to the system controller 102 is a network interface 116 that provides a communications link 200 to one or more connections such as a wired or wireless local area network, wide area network, internet connection, telephone connection, or wireless device carried by a customer. Kiosk 100 may further include an output digital media storage device 114 connected to the system controller 102, which stores customers' information on standard digital media such as a DVD or CD-ROM disk. Finally, the system controller 102 connects to an input unit 120 that may be a keyboard, keypad, trackball, or other device or combination through which the customer can interact with kiosk 100.

The photographic order fulfillment kiosk 100 may include one or more output print devices 110. One embodiment of the output print devices of the present invention includes photographic printers such as dye sublimation printers or ink jet printers with each type of printer using different types of consumable media. The consumable media used by dye sublimation printers includes dye transfer ribbons, photographic paper, and material for a protective overcoat laminate. The consumable media used by inkjet printers includes inkjet cartridges and photographic paper. The output print devices 110 connect to the system controller 102, which controls the utilization of consumable media produced by the photographic printers 110. As described above, the output print devices may also be part of a much larger back office minilab (that has the larger/faster on demand printers) that connect to the a user input terminal containing the system controller 102 and all of the associated data input peripherals. One skilled in the art will appreciate that the functionality of the claimed invention may be split over one or more physical devices that connect to one another through a network as described above.

Figure 3A:
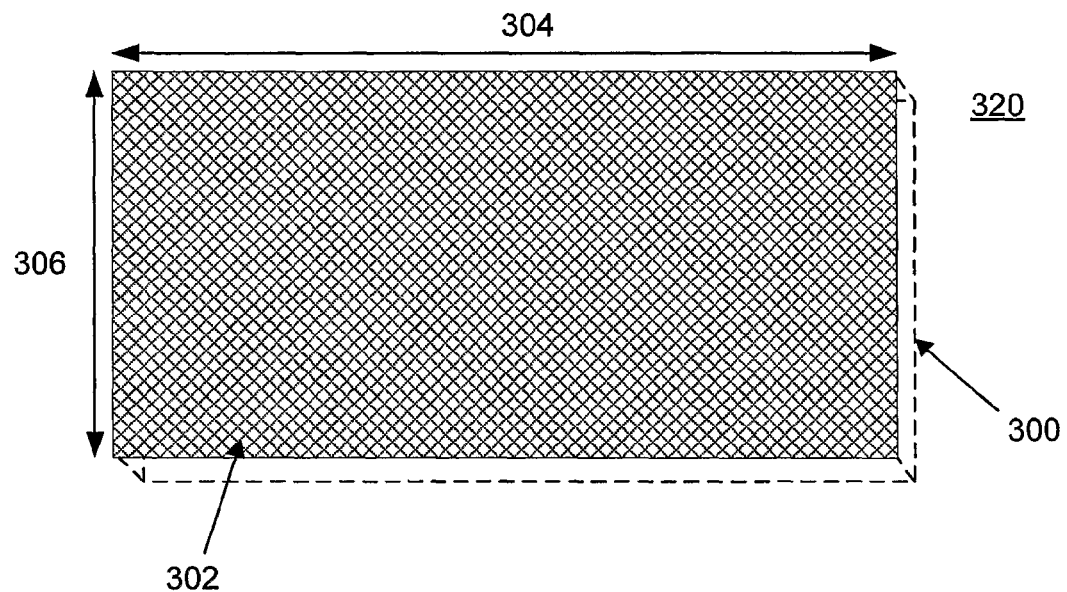
FIGS. 3A and 3B illustrates the creation of the order separator print of the claimed invention.
Figure 3B:
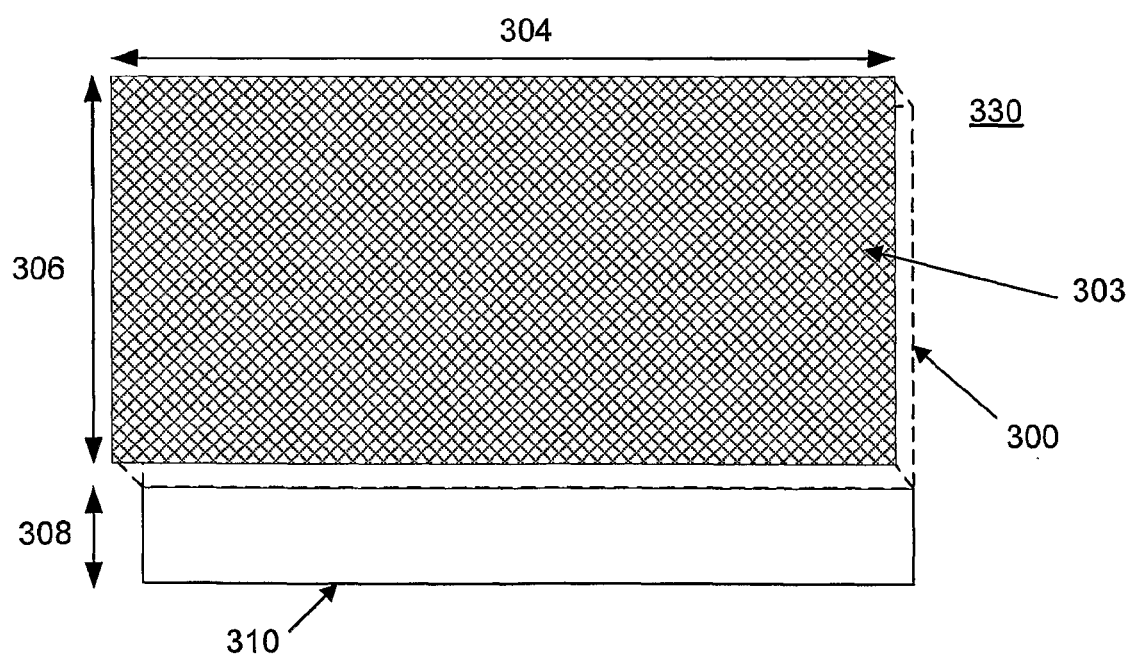

FIGS. 3A and 3B illustrate the claimed invention for photographic prints. FIG. 3A illustrates a typical photographic print 320 made by an output print device 110 such as an on demand dye sublimation printer. To help illustrate the claimed invention, photographic print 320 is a typical 4" (306)×6" (304) photographic print. One skilled in the art will appreciate that the claimed invention is applicable to photographic prints of all sizes.

On demand printers typically have an excess piece of paper (hereafter paper waste) that is cut off and discarded at the end of the photographic printing process. The paper waste is used to handle the photographic paper in the printer and also ensures that the printer can print "full bleed" (edge to edge) without a white border. The photographic image 302 is printed onto photographic paper 300 (photographic paper is one part of the consumable media used during the photographic order fulfillment process). After printing the photographic image 302 on to the photographic paper 300, the output print device 110 then trims the border so that the final product is a photographic print 320 that is edge to edge without a border.

FIG. 3B illustrates the separator print 330 of the claimed invention. As previously discussed, there is not an easy method to separate different photographic orders when using high volume on demand printers. The system controller 102 of the present invention issues a special instruction to the output print device 110 to generate the separator print 330 where the physical size of the print is larger, or oversized in some fashion, than the surrounding photographic prints of the photographic order. As is illustrated by FIG. 3B, the separator print 330 contains the photographic paper 300 as was shown in FIG. 3A. The separator print 330 area may contain a photographic image that is edge to edge without a border on the photographic paper 300. The separator print 330 area may comprise a single photographic image from the photograph order, or it may comprise a single print of thumbnail images that may for example contain thumbnail images of all of the images in the photographic order, or it may even contain text or a combination of text and thumbnail images. Alternatively, the separator print area may be a blank, i.e., that is no photographic image printed on the photographic paper.

Referring back to the separator print 330, the system controller 102 issues an instruction to the output print devices to print the separator print 330. The system controller would instruct the output print device 110 to take the size print of the surrounding photographic prints such as the 4" (306)×6" (304) photographic prints previously discussed and then generate or add the extra piece of photographic paper 310 (which is also referred to as the additional waste area) to the original photographic paper 300. Thus, using the example of the 4"×6" print, the extra photographic paper increases the separator print 330 by 0.3" (308) so that the final size for the separator print 330 is 4.3"×6". The final size of the separator print 330 is larger or is oversized relative to the surrounding photographic prints of the photographic orders. One skilled in the art will appreciate that one may use different sizes for the additional waste area of photographic paper. Additionally, one skilled in the art will appreciate that the additional waste area for the separator print 330 may be printed on the bottom of the separator print area, the top of the separator print area, or even the sides of the separator print area, as all of these locations are within the scope of the claimed invention. With the additional waste area 310, the present invention may leave the additional area blank, or the additional area may contain photographic images, contain text, or contain a combination of photographic images and text. Any of these options allow the user of the claimed invention to be able to easily separate different photographic orders from one another.

Figure 4:
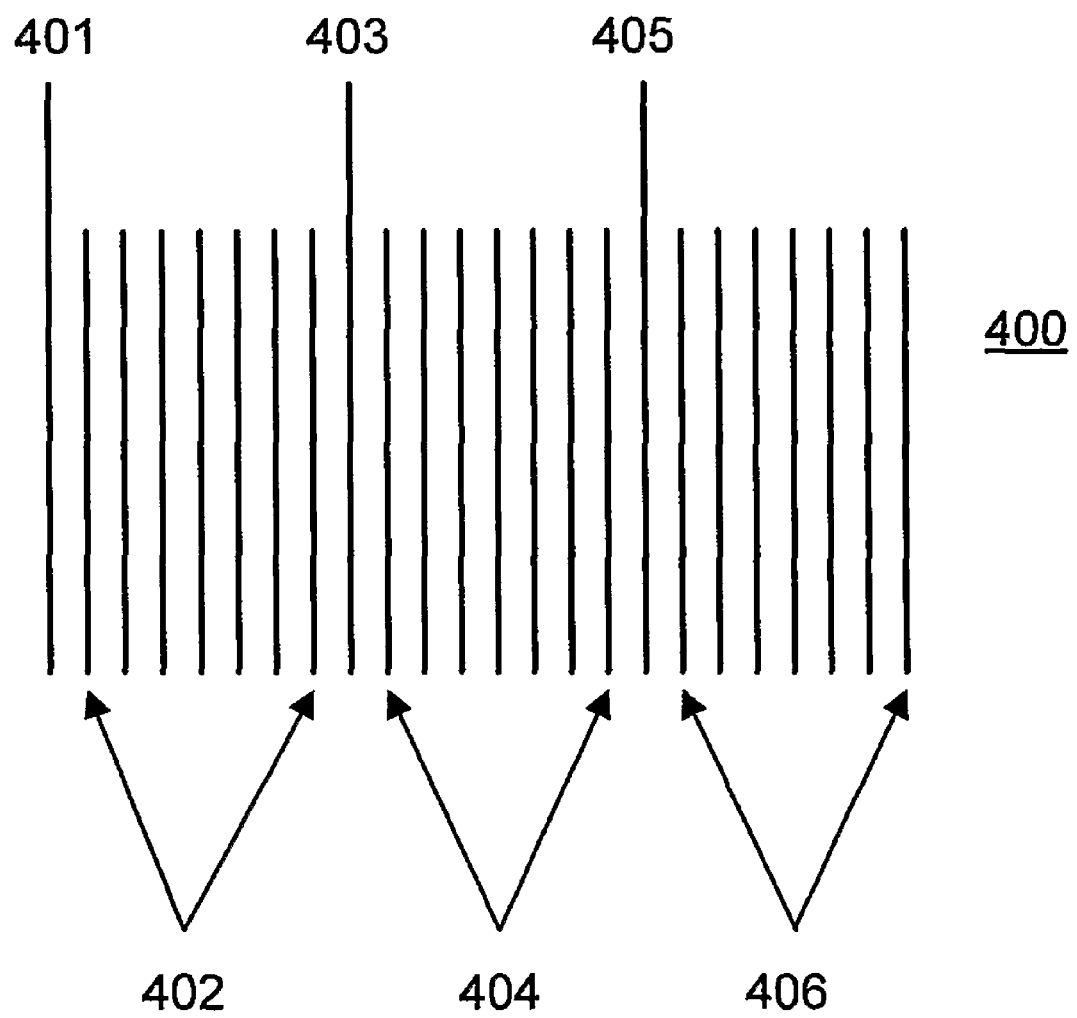
FIG. 4 illustrates the operation of the claimed invention when used to separate different photographic orders during the fulfillment process.

FIG. 4 illustrates the claimed invention when used to separate different photographic orders from a number of orders 400 that are printed consecutively. The separator prints 401, 403, and 405 of the present invention clearly mark the separation of the different photographic orders 402, 404, and 406 generated during the photographic fulfillment process. Each photographic order (402, 404, 406) may contain one or more photographic prints. With multiple photographic orders 400 stacked together as illustrated in FIG. 4, the separator prints effectively create tabs separating the different orders. Thus, the user (store clerk or customer) can quickly and more easily separate different photographic orders.

To summarize, the present invention is a method and apparatus that provides an order separator for photographic order fulfillment. The present invention includes one or more output print devices that print one or more photographic prints of the photographic order using photographic paper. The present invention additionally includes a separator print that comprises a sheet of photographic paper that is larger than the photographic prints of the photographic order. Further, a system controller controls the utilization of the photographic paper of the output print devices for the photographic prints, wherein the system controller controls whether to create the separator print or the photographic prints.

Additionally, the separator print creates a tab separating different photographic orders of the photographic prints.

Further, the separator print may comprise a separator sheet area comprising a single photographic print and an additional waste area made from the photographic paper combined with the separator print area. Additionally, the separator print may comprise a separator print area comprising a single print of thumbnail images and an additional waste area made from the photographic paper combined with the separator print area. Further, the additional waste area may be blank, contain photographic images, contain text, or contain a combination of photographic images and text. Additionally, the separator print may additionally comprise a blank sheet of the photographic paper.

Other embodiments of the invention will be apparent to those skilled in the art after considering this specification or practicing the disclosed invention. The specification and examples above are exemplary only, with the true scope of the invention being indicated by the following claims.

The following invention is claimed:

1. An order separator for photographic order fulfillment, comprising:
    an output print device that prints one or more photographic prints of the photographic order;
    a separator print that comprises a sheet of photographic paper that is larger than said photographic prints of the photographic order; and
    a system controller that controls the utilization of said photographic paper of said output print devices for said photographic prints, wherein said system controller controls whether to create said separator print or said photographic prints;
    wherein said separator print further comprises a separator sheet area comprising a photographic print and an additional waste area made from said photographic paper combined with said separator sheet area, wherein said additional waste area may be blank, contain photographic images, contain text, or contain a combination of photographic images and text.

2. The order separator for photographic order fulfillment of claim 1, said photographic print further comprising a print of thumbnail images.

3. The order separator for photographic order fulfillment of claim 1, wherein said separator print creates a tab separating different photographic orders of said photographic prints.

4. The order separator for photographic order fulfillment of claim 1, wherein said separator print further comprises a blank sheet of said photographic paper.

5. A method to use an order separator for photographic order fulfillment, comprising:
    printing one or more photographic prints of the photographic order;
    creating a separator print that comprises a sheet of photographic paper that is larger than said photographic prints of the photographic order; and
    controlling the utilization of said photographic paper for said photographic prints with a system controller that controls whether to create said separator print or said photographic prints;
    wherein the step of creating a separator print that comprises a sheet of photographic paper that is larger than said photographic prints of the photographic order separator print further comprises creating a separator sheet area comprising a photographic print and an additional waste area made from said photographic paper combined with said separator sheet area, wherein said additional waste area may be blank, contain photographic images, contain text, or contain a combination of photographic images and text.

6. The method to use an order separator for photographic order fulfillment of claim 5, said photographic print further comprising a print of thumbnail images.

7. The method to use an order separator for photographic order fulfillment of claim 5, wherein said separator print creates a tab separating different photographic orders of said photographic prints.

8. The method to use an order separator for photographic order fulfillment of claim 5, wherein said separator print further comprises a blank sheet of said photographic paper.

9. A non-transitory program storage device readable by a computer that tangibly embodies a program of instructions executable by the computer to perform a method to use an apparatus that provides an order separator for photographic order, comprising:
    printing one or more photographic prints of the photographic order using photographic paper with one or more output print devices;
    creating a separator print that comprises a sheet of photographic paper that is larger than said photographic prints of the photographic order; and
    controlling the utilization of said photographic paper of said output print devices for said photographic prints with a system controller that controls whether to create said separator print or said photographic prints;
    wherein the step of creating a separator print that comprises a sheet of photographic paper that is larger than said photographic prints of the photographic order separator print further comprises creating a separator sheet area comprising a photographic print and an additional waste area made from said photographic paper combined with said separator sheet area, wherein said additional waste area may be blank, contain photographic images, contain text, or contain a combination of photographic images and text.

10. The program storage device readable by a computer that tangibly embodies a program of instructions executable by the computer to perform a method to use an apparatus that provides an order separator for photographic order fulfillment of claim 9, said photographic print further comprising a print of thumbnail images.

11. The program storage device readable by a computer that tangibly embodies a program of instructions executable by the computer to perform a method to use an apparatus that provides an order separator for photographic order fulfillment of claim 9, wherein said separator print creates a tab separating different photographic orders of said photographic prints.

12. The program storage device readable by a computer that tangibly embodies a program of instructions executable by the computer to perform a method to use an apparatus that provides an order separator for photographic order fulfillment of claim 9, wherein said separator print further comprises a blank sheet of said photographic paper.

13. A method to manufacture an order separator for photographic order fulfillment, comprising:

providing one or more output print devices that print one or more photographic prints of the photographic order;

wherein said output print devices additionally print a separator print that comprises a sheet of photographic paper that is larger than said photographic prints of the photographic order; and providing a system controller that controls the utilization of said photographic paper of said output print devices for said photographic prints, wherein said system controller controls whether to create said separator print or said photographic prints;

wherein the step of creating a separator print that comprises a sheet of photographic paper that is larger than said photographic prints of the photographic order separator print further comprises creating a separator sheet area comprising a photographic print and an additional waste area made from said photographic paper combined with said separator sheet area, wherein said additional waste area may be blank, contain photographic images, contain text, or contain a combination of photographic images and text.

14. The method of claim 13 wherein said photographic print further comprises a print of thumbnail images.

15. The method of claim 13 wherein said separator print creates a tab separating different photographic orders of said photographic prints.

16. The method of claim 13 wherein said separator print further comprises a blank sheet of said photographic paper.

* * * * *

UNITED STATES PATENT AND TRADEMARK OFFICE
CERTIFICATE OF CORRECTION

| | | |
|---|---|---|
| PATENT NO. | : 8,111,421 B2 | Page 1 of 1 |
| APPLICATION NO. | : 11/886443 | |
| DATED | : February 7, 2012 | |
| INVENTOR(S) | : David J. Oles et al. | |

It is certified that error appears in the above-identified patent and that said Letters Patent is hereby corrected as shown below:

In column 1, line 46, delete "separator" and insert -- separator. --, therefor.

In column 4, line 3, delete "the a" and insert -- the --, therefor.

Signed and Sealed this
Twenty-seventh Day of March, 2012

David J. Kappos
*Director of the United States Patent and Trademark Office*